(12) United States Patent
Thomlinson et al.

(10) Patent No.: US 6,389,535 B1
(45) Date of Patent: May 14, 2002

(54) CRYPTOGRAPHIC PROTECTION OF CORE DATA SECRETS

(75) Inventors: Matthew W. Thomlinson, Bellevue; Scott Field, Renton; Allan Cooper, Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/172,718

(22) Filed: Oct. 13, 1998

Related U.S. Application Data

(63) Continuation-in-part of application No. 09/023,659, filed on Feb. 9, 1998, and a continuation-in-part of application No. 08/996,637, filed on Dec. 23, 1997, and a continuation-in-part of application No. 08/996,634, filed on Dec. 23, 1997, and a continuation-in-part of application No. 08/978,215, filed on Nov. 25, 1997, and a continuation-in-part of application No. 08/884,864, filed on Jun. 30, 1997, now Pat. No. 6,272,631.

(51) Int. Cl.[7] .................................................. G06F 1/24
(52) U.S. Cl. .......................... 713/165; 713/166; 713/193
(58) Field of Search ................................. 713/165, 166, 713/167, 193

(56) References Cited

U.S. PATENT DOCUMENTS

| 4,747,139 A | * | 5/1988 | Taafe ............................ 380/44 |
| 5,689,565 A | | 11/1997 | Spies et al. .................... 380/25 |
| 5,841,870 A | * | 11/1998 | Fieres et al. ................. 713/156 |
| 6,011,847 A | * | 1/2000 | Follendore ................... 713/160 |
| 6,023,506 A | * | 2/2000 | Ote et al. .................... 713/165 |

FOREIGN PATENT DOCUMENTS

| EP | 0 442 839 A3 | 1/1991 |
| EP | 0 456 386 A2 | 4/1991 |
| EP | 0 717 339 A2 | 11/1995 |
| EP | 0 820 017 A2 | 3/1997 |

OTHER PUBLICATIONS

The Open Group, Common Security: CDSA and CSSM, 1997, Document No.: C707, Chs. 1 and 2.*
John H. Wilson, CDSA Update (Common Data Security Architecture), Intel, p. 12.*

* cited by examiner

Primary Examiner—Thomas R. Peeso
(74) Attorney, Agent, or Firm—Lee & Hayes, PLLC

(57) ABSTRACT

Described herein is a system for protecting data from unauthorized access. The system uses a central service provider with exposed complementary interfaces: a data protect function that accepts clear data and returns an encrypted representation of the data, and a data unprotect function that accepts encrypted data and returns corresponding clear or unencrypted data. In addition, a user-readable description is optionally packaged with the encrypted data. Different encryption providers can be registered to perform actual encryption and decryption. A default encryption provider performs encryption and decryption based on a user logon secret such as a password. The default encryption provider also accepts additional entropy from calling application programs. The default encryption provider utilizes a multi-level key encryption scheme to minimize the amount of encryption that has to be re-done when the user changes a password. In addition, data recovery information is escrowed so that keys can be recovered when a user's password is changed.

55 Claims, 7 Drawing Sheets

CRYPTOGRAPHIC PROTECTION OF CORE DATA SECRETS

RELATED APPLICATIONS

This application is a continuation-in-part of a U.S. patent application entitled "Protected Storage of Core Data Secrets"; Ser. No. 08/884,864; by inventors Matthew W. Thomlinson, Scott Field, and Allan Cooper; filed Jun. 30, 1997, now U.S. Pat. No. 6,272,631, hereby incorporated by reference.

This application is a continuation-in-part of a U.S. patent application entitled "Protected Storage of Core Data Sheets"; Ser. No. 08/978,215, by inventors Matthew W. Thomlinson, Scott Field, and Allan Cooper; filed Nov. 25, 1997.

This application is a continuation-in-part of a U.S. patent application entitled "Method and System for Securely Archiving Core Data Secrets", Ser. No. 08/996,634, by inventors Matthew W. Thomlinson, Scott Field, and Allan Cooper; filed Dec. 23, 1997.

This application is a continuation-in-part of a U.S. patent application entitled "Server Verification of Requesting Clients", Ser. No. 08/996,637, by inventors Matthew W. Thomlinson, Scott Field, and Allan Cooper; filed Dec. 23, 1997.

This application is a continuation-in-part of a U.S. patent application entitled "Authenticating User Prompts", Ser. No. 09/023,659, by inventors Matthew W. Thomlinson, Scott Field, and Allan Cooper; filed Feb. 9, 1998.

TECHNICAL FIELD

This invention relates to systems and methods that provide central services for encrypting core data secrets such as passwords, cryptographic keys, and sensitive personal or financial codes.

BACKGROUND OF THE INVENTION

Increasingly, financial and other sensitive transactions are being performed by personal computers. This has increased the need for secure storage of data. Modem cryptography techniques are often used to protect such data from unauthorized access.

New security methods, however, have brought about a need to store and protect "core" data secrets, such as private cryptographic keys, credit card numbers, and other small pieces of secret data. In many cases, this responsibility is left to individual application programs or to personal computer users themselves. Although programs are available that allow users to encrypt and store data, such programs cannot typically be used by other application programs. Currently, each application program has to devise a safe and secure method to store such data.

The invention described below solves this problem by providing a set of services that encrypt supplied data with minimal supervision by calling application programs, and with minimal participation by users.

SUMMARY OF THE INVENTION

The invention described below provides central data protection services that can be called by application programs to encrypt core secrets. An embodiment of the invention is implemented as a server process and an associated interface that can be invoked by application programs to store and retrieve small data items. One or more encryption providers can be installed for operation in conjunction with the server process. Each encryption provider is adapted to encrypt data in accordance with some predefined method, potentially utilizing newly-developed security-related hardware such as smart cards. Details of the encryption mechanism and process are hidden from the calling application programs.

A default encryption provider is provided. The default encryption provider uses cryptographic services provided by the Win32 API which is part of the Windows brand operating systems. In addition, the default provider authenticates users based on a previous network logon. Furthermore, actual encryption is based on the user's logon password or some other secret supplied during network logon. Because of this, the user is not required to enter any further password when actual encryption or decryption takes place.

Application programs interact with the storage server through well-defined interfaces. A data item can be stored with a simple call to the storage server, and can be retrieved later with a similar call. All encryption, decryption, item integrity checks, and user authentication are performed by the server and its associated providers. Because of this, application programs can take advantage of advanced security features without adding complexity to the application programs themselves.

The default encryption provider implements a multi-level key encryption scheme to minimize the amount of encryption that has to be re-done when the user changes a password. Each data item is encrypted using an item key that is generated randomly by the system. The item key is in turn encrypted with a master key that is itself encrypted (as described below) with a key derived from the user-supplied password (such as the user's logon password). Information required to reconstruct these keys is escrowed between the local computer and a domain controller, for recovery of the keys in the case that the user's password is lost or is changed.

The default encryption provider implements functions in addition to basic encryption and decryption. For example, the provider accepts an optional userreadable data description which is encrypted and packaged with the encrypted data itself.

The default encryption provider also has a high-security mode that can be requested by application programs. In this mode, the encryption provider prompts the user to enter a special key combination to invoke a secure operating system mode. This operating system mode cannot be initiated programmatically, and therefore cannot be invoked by hostile application programs. Once in the secure operating system mode, the user is given another prompt. A response by the user exits the secure operating system mode and serves to authorize the requested encryption or decryption. Both of these prompts have customizable visual characteristics so that a user can detect when a hostile program attempts to emulate such prompts.

DETAILED DESCRIPTION

Cryptography Overview

Figure 1:
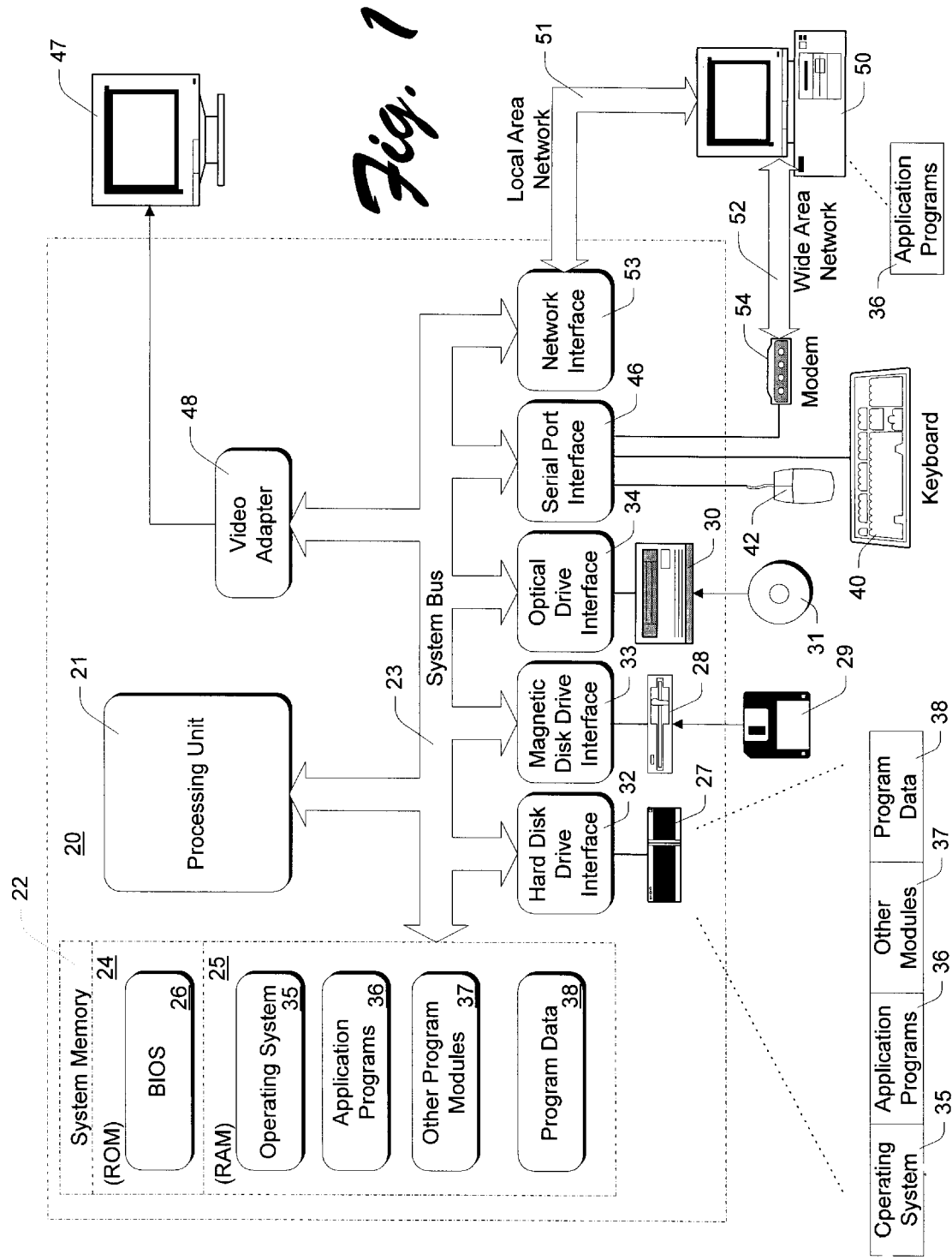
FIG. 1 is a block diagram of an exemplary computer system suitable for use in implementing the invention.

In general, cryptography is the process for encrypting or scrambling messages such that the messages can be stored and transmitted securely. Cryptography can be used to achieve secure communications, even when the transmission media (for example, the Internet) is untrustworthy. Computer users also use cryptography to encrypt sensitive files, so that an intruder cannot understand them. Cryptography can be used to ensure data integrity as well as to maintain secrecy. It is also possible to verify the origin of data items using cryptography, though the use of using digital signatures. When using cryptographic methods, only the cryptographic keys must remain secret. The algorithms, the key sizes, and file formats can be made public without compromising security.

Using data encryption, a data item can be scrambled so that it appears like random gibberish and is very difficult to transform back to the original data without a secret key. This message can consist of ASCII text, a database file, or any other data.

Once a data item has been encrypted, it can be stored on non-secure media or transmitted over a non-secure network, and still remain secret. Later, the message can be decrypted into its original form.

When a data item is encrypted, an encryption key is used. This is comparable to a key that is used to lock a padlock. To decrypt the message, a decryption key must be used. The encryption and decryption keys are often, but not always, the same key.

There are two main classes of encryption algorithms: symmetric algorithms and public-key algorithms (also known as asymmetric algorithms). Systems that use symmetric algorithms are sometimes referred to as conventional.

Symmetric algorithms are the most common type of encryption algorithm. They are known as symmetric because the same key is used for both encryption and decryption. Unlike the keys used with public-key algorithms, symmetric keys are frequently changed.

Compared to public-key algorithms, symmetric algorithms are very fast and, thus, are preferred when encrypting large amounts of data. Some of the more common symmetric algorithms are RC2, RC4, and the Data Encryption Standard (DES).

Public-key (asymmetric) algorithms use two different keys: the public key and the private key. The private key is kept private to the owner of the key pair, and the public key can be distributed to anyone who requests it (often by means of a certificate). If one key is used to encrypt a message, then the other key is required to decrypt the message.

Public-key algorithms are very slow—the order of 1,000 times slower than symmetric algorithms. Consequently, they are typically used only to encrypt session keys. They are also used to digitally sign messages.

One of the most common public-key algorithms is the RSA Public-Key Cipher.

Digital signatures can be used to distribute an unencrypted data item, while allowing the recipients to be able to verify that the message comes from its purported sender and that it has not been tampered with. Signing a message does not alter the message, it simply generates a digital signature string that can either be bundled with the message or transmitted separately.

Digital signatures are generated by using public-key signature algorithms: a private key is used to generate the signature, and the corresponding public key is used to validate the signature.

Authentication involves the process of verifying the identity of a person or entity. Certificates are a common way to achieve authentication. A certificate is a set of data that completely identifies an entity, and is issued by a Certification Authority (CA) only after that Authority has verified that the entity is who it says it is. The data set includes the entity's public cryptographic key. When the sender of a message signs data with its private key (and sends a copy of its certificate with the message), the recipient of the message can use the sender's public key (retrieved from the certificate) to verify that the sender is who it says it is. Certificates can also be used to verify that data (including application programs) have been vouched for by a trusted source.

On a network, there is often a trusted application running on a secure computer that is known as the Certification Authority. This application knows the public key of each user. Certification Authorities dispense messages known as certificates, each of which contains the public key of one of its client users. Each certificate is signed with the private key of the Certification Authority.

The invention described below utilizes techniques such as the well-known digital encryption, signing, and authentication techniques described above. For further information regarding such techniques, refer to Schneier, Bruce; *Applied Cryptography Second Edition: Protocols, Algorithms, and Source Code in C*; John Wiley & Sons, 1996, which is hereby incorporated by reference. The following discussion assumes general familiarity with these topics.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The illustrated computer uses an operating system such as the Windows family of operating systems available from Microsoft Corporation. The functionality described below is implemented using standard programming techniques, including the use of OLE and COM interfaces such as described in Brockschmidt, Kraig; *Inside OLE* 2; Microsoft Press, 1994, which is hereby incorporated by reference.

More recent Windows operating systems utilize what is referred to as the Win32 API: a well-defined set of interfaces that allow application programs to utilize functionality provided by the Windows operating systems. The Win32 API is documented in numerous texts, including Simon, Richard; *Windows 95 Win32 Programming API Bible*; Waite Group Press, 1996, which is hereby incorporated by reference. General familiarity with this type of programming is assumed throughout the following discussion. The Win32 API includes numerous functions that can be called by application programs to perform cryptographic functions.

Generally, the data processors of computer 20 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Overall Functionality and Architecture

Figure 2:
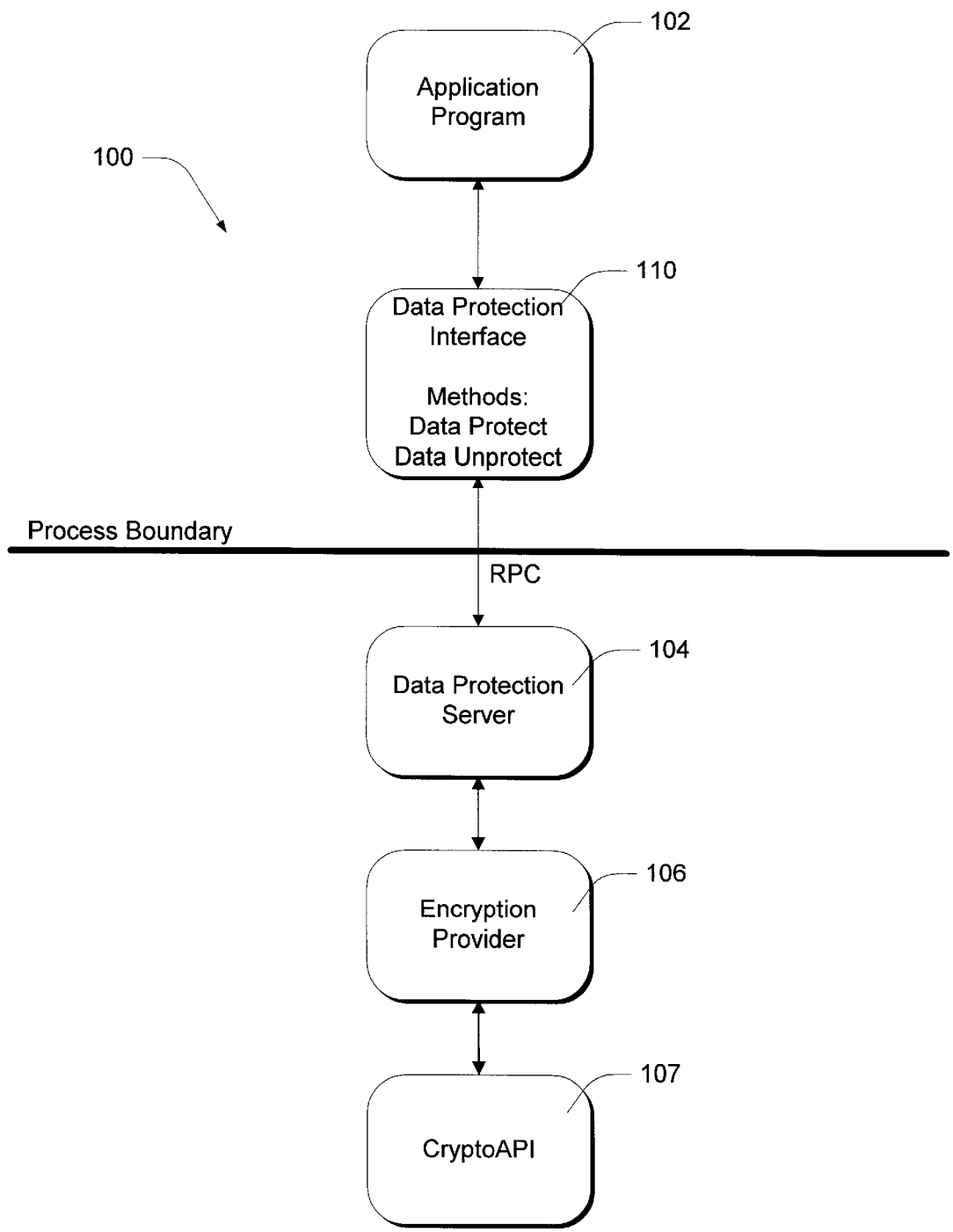
FIG. 2 is a block diagram of a data protection system in accordance with the invention.

FIG. 2 shows architectural components of a data protection system 100 in accordance with the invention for encrypting data items and for protecting them from unauthorized access. The data protection system allows application programs to protect data items that must be kept private and free from tampering. Such data items might include cryptographic keys, passwords, financial information, trust profiles, etc. The data protection system is executed by a computer such as described above with reference to FIG. 1.

Data protection system 100 includes a server or server component 104, also referred to as a dispatcher or a data protection server. Generally, the server, through a data protection interface 110, receives data items from application programs, encrypts the data items, and returns encrypted representations of the data items to the application programs. The server also authenticates the current user of the computer, and performs authentication and verification procedures with respect to the requesting application programs, as will be explained in more detail below. Interface 110 is implemented as a conventional COM interface for operation under the Windows NT operating system.

Associated with the server component are one or more installable encryption providers. Shown in FIG. 2 is a default or base encryption provider 106. It utilizes cryptographic services 107 of the Win32 API (referred to as the CryptoAPI services) to encrypt and decrypt data supplied by application programs. The encryption and decryption are based on one or more keys that are derived from authentication of the current computer user. Specifically, the default encryption provider identifies the current computer user based on the logon identification and password provided by the user while logging on to the computer's operating system or to a network operating system, and uses the password to derive a key for encryption.

Although a default encryption provider is implemented, additional providers can be installed in the future to take advantage of new encryption and authentication technologies. For example, an installed encryption provider might utilize a smart card for purposes of both encryption and user authentication.

Well-defined COM interfaces are used between the data protection server and the various encryption providers, allowing new providers to be easily installed and registered with the server. Application programs are able to make the same calls to data protection server 104 (through interface 110) regardless of which providers are used. Because of this, application programs can be written to take advantage of future technologies by simply interacting with data protection server 104, and without having to concern themselves with the details of such future technologies.

To increase security, the data protection server and encryption providers are implemented and executed in a different address space than the calling application programs. Communications across the process or address space boundary take place using remote procedure calls (RPCs). Such calls can be made when operating under Windows operating systems and other operating systems. The functionality and formatting of RPC calls is documented in the Microsoft Win32 Software Development Kit.

Although application programs can make RPC calls directly, this complexity is avoided by providing a dynamically linked library (DLL) that can be executed in the application programs' address spaces. This library implements data protection interface 110 interface and associated methods that can be called by the application programs to exploit the full functionality of the data protection system. Specifically, the interface includes two methods as shown in FIG. 2: a data protect method for encrypting data items and a data unprotect method for decrypting data items. The interface and methods in the described embodiment are implemented using COM (component object model) features of the Windows operating system.

Data Protection API

The data protection API in the described embodiment of the invention includes two methods or functions: a data protect method for encrypting data; and data unprotect method for decrypting the data. The data protect method accepts clear data from an application program and returns encrypted data to the application program. The data unprotect method accepts encrypted data back from the application program and returns the corresponding clear data to the application program. Note that the term "clear" is used herein merely to differentiate the original data from the encrypted version or representation of the same data.

These methods also provide other features in addition to basic encryption and decryption. For example, both methods accept an optional entropy parameter. Through the use of this parameter, an application can specify that encryption and decryption are to be based at least in part upon some password or code supplied by the application program. Once such password entropy is specified for encryption, the same password must be specified for successful decryption—the server component does not record the optional entropy.

In many cases, the application program will request the password or code from a user prior to calling the data protect and unprotect methods. Depending on the encryption provider being used, this might be the sole source of entropy for the encryption and decryption of the submitted data. Alternatively, the encryption provider might supply additional entropy, as in the case of the default encryption provider described below.

The data protect method also accepts an optional user-readable description of the clear data. This description is encrypted and returned along with the encrypted data, packaged as a single data block. When the encrypted data block is passed to the data unprotect method, the data unprotect method decrypts the encrypted data and description, unpackages the description from the original clear data, and returns the description as an independent parameter to the calling application program.

Both the data protect method and the data unprotect method accept an additional parameter that designates a particular encryption provider for use instead of the default encryption provider described herein.

Finally, the data protect method and the data unprotect method accept a parameter that specifies one or more flags that are specific to the particular encryption provider specified.

The various parameters received by the data protect method and the data unprotect method are passed on to server component 104, which calls the specified encryption provider to produce the required return parameters.

Default Encryption Provider

In response to invocation of either the data protect method or the data unprotect method, server component 104 performs a step of calling the designated encryption provider to perform the encryption and decryption steps. Different installed encryption providers may protect data in different ways. However, some type of cryptography will usually be employed.

The default encryption provider described herein uses a password-based encryption scheme, wherein data items are encrypted based on passwords, or some other codes related to user authentication, before storing the data items. When retrieving the data items, decryption is based on the same passwords or codes. In the embodiment described herein, an optional user-readable description is encrypted along with a corresponding data item, and returned as a block to a calling application. In addition, various encrypted keys and authentication codes are returned as explained below.

More specifically, encryption and decryption are based primarily on a password or other code that is supplied by the current computer user during a previous computer or network operating system authentication or logon procedure.

Typically, a user's logon name and password are used to form or derive a key that is used for encrypting and decrypting data items. If an optional entropy parameter is specified in the data protect and data unprotect methods, this parameter is cryptographically mixed with the logon name and password.

Figure 3:
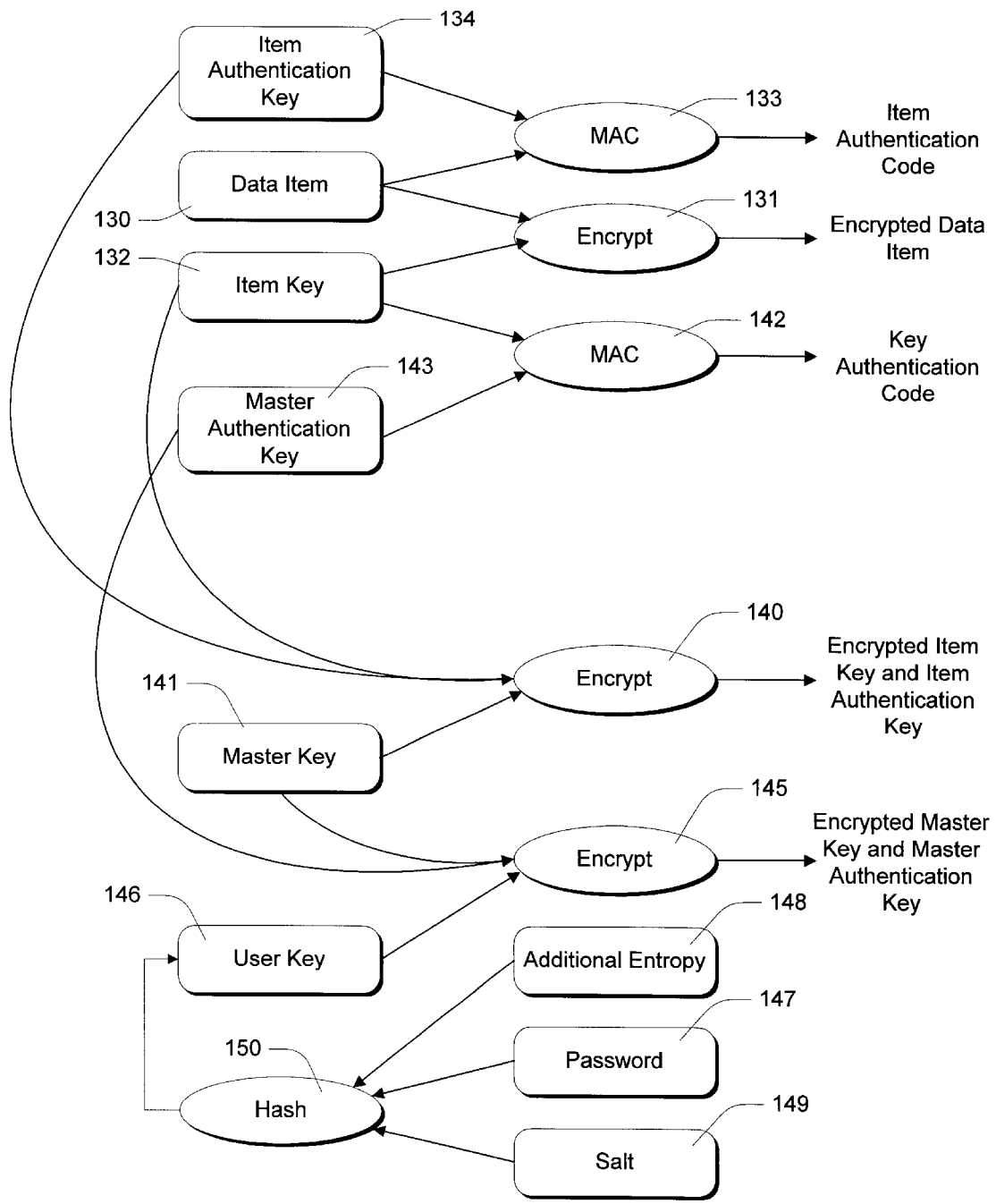
FIG. 3 is a process diagram illustrating how data items are encrypted and authenticated in accordance with the invention.

In the described embodiment, a multi-level key technique is used to encrypt data items based on user-supplied codes or passwords. This technique is illustrated in FIG. 3. In this implementation, encryption and decryption use one or more keys that are derived from the supplied passwords or logon codes.

Generally, an item key is randomly generated for each data item received via the data protect function. The data item is encrypted with its corresponding item key. An item authentication key is also generated randomly for each item and is used to generate an item authentication code. Item authentication codes are used during decryption to verify that data items are decrypted correctly.

The item key and item authentication key are then encrypted using a master key. The master key is a randomly generated number. A master authentication key is also generated and used to calculate a key authentication code so that the correct decryption of the item key and item authentication key can be verified later. Finally, the master key and master authentication key are encrypted using a code that is derived from user authentication or identification, in combination with any user-supplied entropy.

With reference now to the specific steps of FIG. 3, an individual data item that is to be encrypted and stored is referenced by numeral 130. A step or operation 131 is performed of encrypting data item 130 using an item key 132. Specifically, cryptographic key 132 is used to perform a DES encryption on data item 130. Item key 132 is generated as a random number by the default encryption provider.

The encryption provider also performs a step 133 of generating an item authentication code for individual data item 130. The item authentication code is generated using a MAC (message authentication code) in conjunction with a randomly generated item authentication key 134. MACs are described in the Schneier text mentioned above.

A further step 140 is performed of encrypting the item key 132 and the item authentication key 134 with a master key 141, again using the DES encryption mentioned above. The master key is a random number. A step 142 comprises generating a key authentication code for the combination of the item key and the item authentication key. The key authentication code is generated with a MAC in conjunction with a randomly generated master authentication key 143.

A step 145 is performed of encrypting the master key and the master authentication key with a user key 146. This is again a DES encryption.

The user key is derived from the user-supplied password or code, referenced in FIG. 3 by numeral 147, and from any application-supplied entropy, indicated by numeral 148. To generate the user key, the user-supplied password 147 and application-supplied entropy 148 are appended to a random number referred to as a salt 149, and hashed in a step 150 using an SHA-1 hashing function. This results in a number referred to as the user key.

Once these steps are performed, the encryption provider stores combines the encrypted individual data item, the item authentication code, the encrypted item key, the encrypted item authentication key, the key authentication code, the encrypted master key, and the encrypted master authentication key, and returns all of these in a single package to the calling application program. For purposes of this description, the user-readable description is considered part of data item 130.

Decryption utilizes the reverse process. The encrypted items are supplied by an application program. The encryption provider derives the user key from the user-supplied password and uses the user key to decrypt the master key and master authentication key. The master authentication key is used in conjunction with the specified MAC to verify that the master key decrypted correctly. The master key is then used to decrypt an appropriate item key and corresponding item authentication key. The item authentication key is used in conjunction with the MAC to verify that the item key decrypted correctly. The item key is then used to decrypt the actual data item.

This process allows all of a user's data items to be controlled by a single master key that is in turn encrypted as a function of the user's password. The advantage of this scheme is that data items do not have to be re-encrypted when the user changes his or her password. Rather, only the master key needs to be encrypted again.

Key Backup and Recovery

As described, the user key and master key can be derived from a password or other code that is supplied by the current computer user during a previous computer or network operating system authentication or logon procedure. A potential problem arises when the user's network password is changed without participation of the local computer. This might happen, for instance, when the user changes his or her network logon password while using a different computer. It might also happen when the user's password is reset by a system administrator.

The invention includes a way to recover the user key or the master key in this situation. One way to backup the master key would be to simply store it on the local hard disk. However, the key would then be available for use by hostile entities such as viruses or unauthorized computer users. It could alternatively be backed up on a server. This, however, would require significant overhead on the server. Instead, the inventors have developed a way to store the user key on the local computer without exposing it to hostile entities. Specifically, the user key or other data item cannot be accessed based on information stored by the local computer. Rather, decryption requires the participation of a network supervisory computer such as a network domain controller. However, the network supervisory controller is not required to store any information particular to the local computer or to the stored data secret. All data items are stored on the local computer while remaining inaccessible without the supervisory computer's participation.

Figure 4:
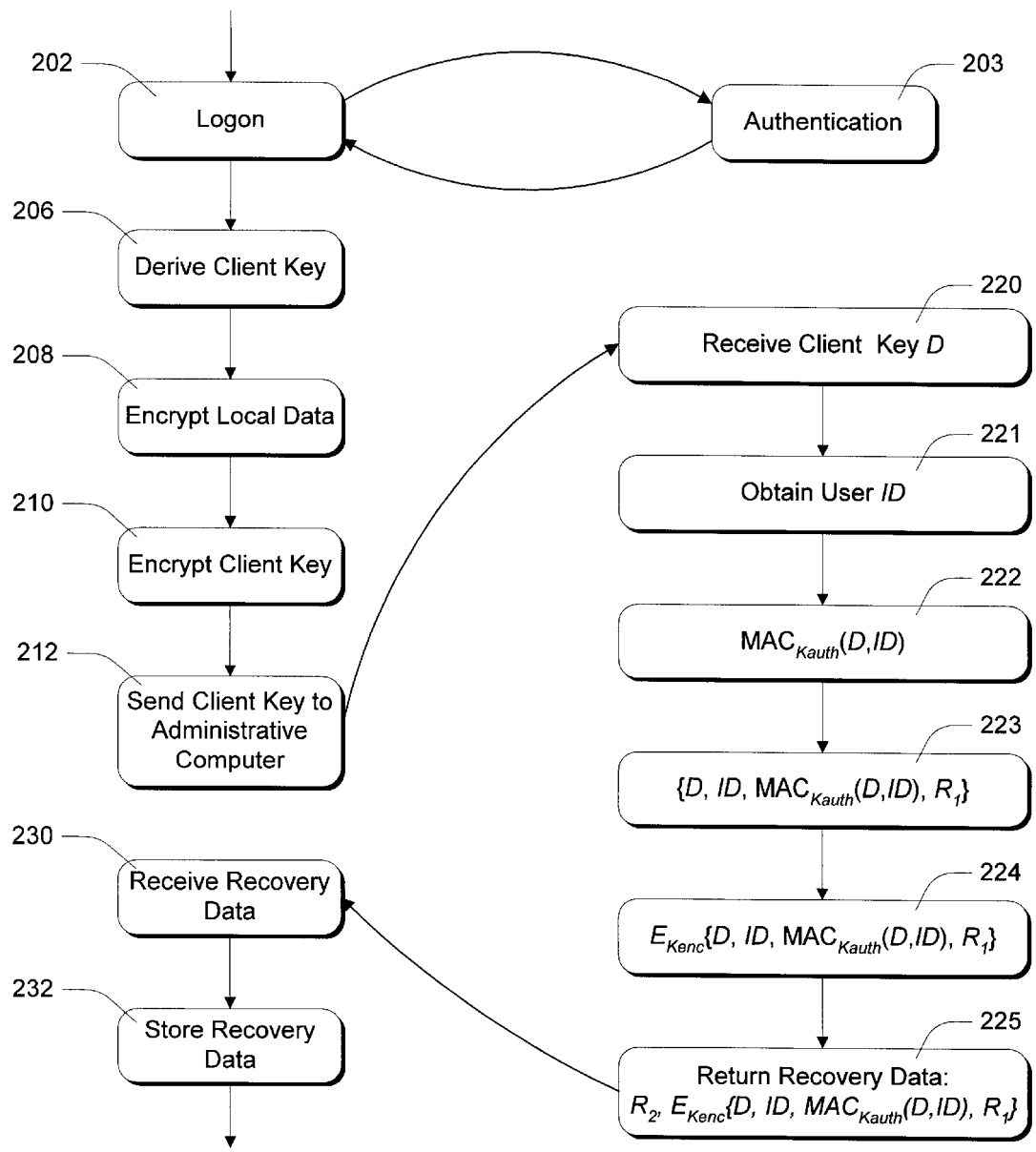
FIG. 4 is a flowchart illustrating steps performed in escrowing or backing up key recovery data in accordance with the invention.
Figure 5:
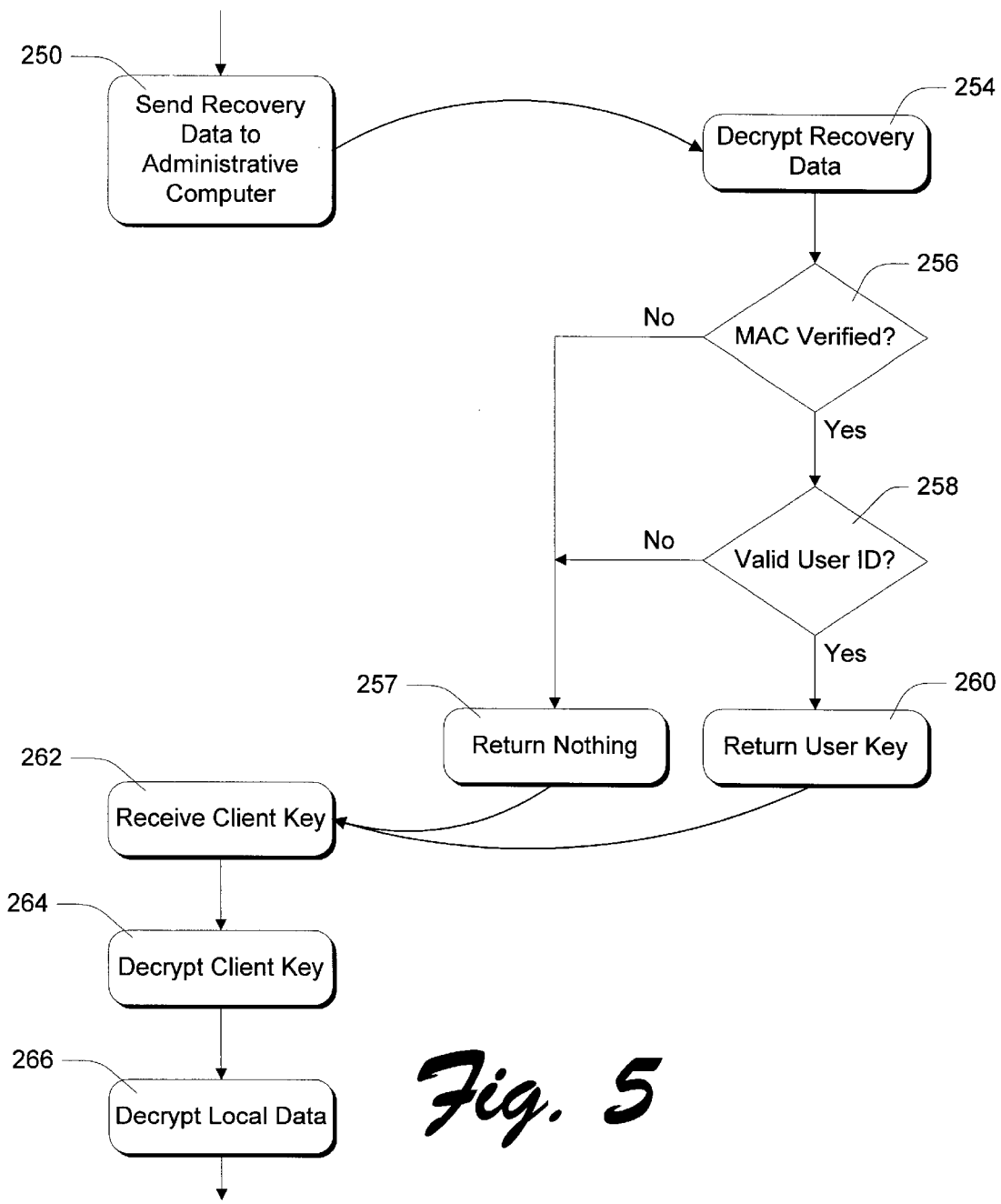
FIG. 5 is a flowchart illustrating steps performed in restoring key recovery data in accordance with the invention.

FIGS. 4 and 5 illustrate a method of securely storing and recovering data protection keys and other data items. The steps on the left-hand sides of the drawings are performed by the encryption provider 106 of the local computer. The steps on the right-hand sides of the drawings are performed by a domain controller or other network supervisory computer.

A domain controller is responsible for authenticating users before allowing such users to access network resources. Authentication involves a user logon process, during which the user is asked to submit some secret information such as a password or PIN. In the future, other authentication mechanisms might be used, such as smart cards, which would supply the requested user secret on the user's behalf. In most cases, a domain controller is one of a plurality of domain controllers in a group of domain controllers that share responsibilities. A client computer, when logging on to a network, randomly selects one of the domain controllers to perform authentication steps and to perform the key backup steps described below.

FIG. 4 shows steps performed in securing a user key. Blocks 202 and 203 represent the step of authenticating a current user of a network client through a network logon procedure. This step happens when the current computer user begins using the local computer. The logon takes place at the local or client computer in step 202, and the local computer passes the logon information to the domain controller which authenticates the user in step 203. Generally, each user has a user identification and associated password that are entered in response to a logon prompt. These are compared against information maintained by the domain controller to determine whether the user is authorized to access network resources.

Step 206 comprises deriving the user key, also referred to herein as a client key, from a logon password or some other user secret that is supplied by the current user during network logon procedures. The user key is derived as discussed above, with reference to FIG. 3.

Step 208 comprises securing core data secrets or other local user data with the derived user key. In the embodiment described herein, the core data secrets are encrypted with the user key or with other keys that are derived from or encrypted with the user key.

Step 210 comprises an optional step of encrypting the user key. The user key is encrypted using an encryption key that is then stored locally by the encryption provider on the local computer. This encryption is meant to shroud the user key from the domain controller during subsequent steps.

Step 212 comprises sending the encrypted user key to the network supervisory computer, after performing the optional step of encrypting the user key. A local copy of the user key is not maintained or stored on the local computer. Rather, the user key is sent to the supervisory computer, which returns encrypted recovery data from which the user key can be obtained. However, the user key cannot be obtained from the encrypted data by the local computer alone. Rather, subsequent recovery of the user key requires help from the supervisory computer.

The encrypted data returned by the supervisory computer and stored by the local computer will be referred to herein as key recovery data. Steps 220 through 225 are performed by the network supervisory computer to produce the key recovery data.

Step 220 comprises receiving the user key (optionally encrypted), which will be referred to herein as data item D. A step 221 comprises obtaining a user identification ID that corresponds to the currently authenticated user of the local computer that submitted data item D. This identification is normally maintained by the supervisory computer in response to a user logon procedure.

Step 222 comprises creating a message authentication code based at least in part on the user key and the user identification, using a message authentication key $K_{auth}$. The message authentication code is referred to herein as $MAC_{Kauth}(D,ID)$. $K_{auth}$ is derived from a fixed master key $K_{mast}$ and a first random key $K_{R1}$, using a predetermined one-way hash function. $K_{mast}$ is a key that is maintained by and stored at the network supervisory computer. $K_{R1}$ is a key that is generated for each individual user, or for each data item that is submitted to the network supervisory computer. $K_{R1}$ is not stored at the supervisory computer, but is returned to the local computer 20 in a subsequent step, along with encrypted versions of data item D and user identification ID.

Step 223 comprises appending the user identification ID, the first random key $R_1$, and the message authentication code $MAC(D,ID)_{KR1}$ to the data item D received from the client computer, to form a data combination as follows: {D, ID, $MAC_{Kauth}(D,ID)$, $R_1$}.

Step 224 comprises encrypting this data combination at the network supervisory computer. This encryption is performed using an encryption key $K_{enc}$. $K_{enc}$ is derived from fixed master key $K_{mast}$ and a second random key $K_{R2}$, using a predetermined on-way hash function. Similarly to $K_{R1}$, $K_{R2}$ is a key that is generated for each individual user or data item that is submitted to the network supervisory computer. Again, $K_{R2}$ is not stored at the supervisory computer, but is returned to the local computer 20 in a subsequent step. The encrypted data combination is represented as follows: $E_{Kenc}${D, ID, $MAC_{Kauth}(D,ID)$, $R_1$}.

The fixed master key $K_{mast}$ is preferably replicated across an entire group of domain controllers in a domain, thereby allowing any one of the domain controllers to perform key encryption and recovery operations. If one of the domain controllers becomes inoperational, its responsibilities (including key recovery responsibilities) are assumed by another one of the domain controllers.

Step 225 comprises a step of returning the encrypted data combination $E_{Kenc}${D, ID, $MAC_{Kauth}(D,ID)$, $R_1$} to the encryption provider of the client computer, and returning second random key $R_2$ along with the encrypted data combination. The encrypted data combination and second random key $R_2$ comprise recovery data that can be resubmitted to the supervisory computer if it becomes necessary to recover the user key. In an alternative embodiment, $R_1$ can be excluded from the encrypted data combination, and returned separately to the client computer.

Step 230, performed by the client computer comprises receiving the recovery data from the supervisory computer. Subsequent step 232 comprises storing the recovery data locally (including random key $R_2$ and random key $R_1$ in some embodiments), on a hard disk or other non-volatile storage.

FIG. 5 shows the steps performed in order to recover a data item D that has been backed up or escrowed in the manner described above. The data item is said to be escrowed because neither the client computer nor the supervisory computer can access or make use of the data item without the participation of the other. In the invention embodiment described herein, the data item is recovered from the recovery data only when it becomes impossible to regenerate the data item from the user's logon password—such as when the password has changed. When storage provider 106 determines that this has occurred, and that it is necessary to recover the data item, it performs a step 250 of sending the recovery data $E_{Kenc}${D, ID, $MAC_{Kauth}(D,ID)$, $R_1$} as well as locally stored keys $R_1$ (if $R_1$ is stored apart from the encrypted data combination) and $R_2$ to the network supervisory computer. In response to receiving the recovery data, the supervisory computer uses the received $R_2$ to derive $K_{enc}$, and then performs a step 254 of decrypting $E_{Kenc}${D, ID, $MAC_{Kauth}(D,ID)$, $R_1$} to obtain data item D, user identification ID, message authentication code $MAC_{Kauth}(D,ID)$, and first random code $R_1$. $R_1$ is used in combination with $K_{mast}$ to derive message authentication key $K_{auth}$, and a step 256 is performed of verifying the authentication code $MAC_{Kauth}(D,ID)$. If this authentication fails, nothing is returned to the client (step 257). Otherwise, a step 228 is performed of determining whether the user identification contained in the recover data corresponds to the currently authenticated user of the client computer. A step 260 is performed only if the user identification obtained from the recovery data corresponds to the currently authenticated user of the client computer. Otherwise, nothing is returned to the client computer (step 257). Thus, step 260 is conditioned upon a successful authentication of the combined data item D and user identification ID, and upon a successful authentication of the user indicated by the user identification contained in the recovery data.

Assuming that authentication steps 256 and 258 succeed, client computer 20 receives data item D in step 262 and performs a step 264 of decrypting the data item to obtain the user key that was previously used to safeguard local data. A step 266 is performed of decrypting or unlocking the local data with the client key. The local key is then used by storage provider 106 to unlock any secured data.

Verification of System Integrity

The data protection server and encryption providers employ a security interlock mechanism to prevent security violations that might result from tampering with system components. This mechanism utilizes cryptographic techniques.

One motivation for the security interlock mechanism is to prevent nonauthorized providers from being loaded by the data protection server. It is particularly important to prevent a non-authorized module from masquerading as an authorized provider, since such a non-authorized module could steal secret data from the system. Another motivation is to prevent tampering with the data protection server itself.

When the server and providers are shipped, they are digitally signed with the private key of a public/private cryptographic key pair—the private key has a corresponding public key. The public key is then hard-coded into the various modules of the server and providers. The server and the providers are configured to verify each others' signatures using the public cryptographic key whenever an individual component is loaded and executed. When the server is loaded, it first checks its own integrity by checking its own digital signature with the public key. The server then checks the digital signatures of other core components as they are loaded. As each component is loaded, it checks the digital signature of the server. If any integrity check fails, none of the components will operate.

High-Security Mode

When calling the data protect method, an application program can specify flags or indicators that are particular to the selected encryption provider. The default encryption provider accepts an optional high-security indicator from the application along with the clear data, and in response provides heightened security when encrypting and decrypting information. Normally, when this indicator is not set, encryption and decryption take place with no user interaction other than that presented by the application program itself. When the indicator is set, however, the default encryption provider interacts with the user, asking the user to confirm that he or she wishes the requested encryption or decryption to take place.

When the high security level is set, the encryption provider takes advantage of the "secure desktop" mode implemented in the Windows NT operating system. In the Windows NT operating system, a user can enter a secure attention sequence (SAS) to switch to a secure desktop that only the operating system can access. The SAS cannot be emulated programmatically, and the secure desktop mode similarly cannot be initiated programmatically—the only way to activate it is for the user to manually enter the SAS. The default SAS for a standard Windows NT system is the CTRL+ALT+DEL key combination on a conventional keyboard. Developers can provide replacement NT software components so that other mechanisms can be used for the SAS (such as insertion of a smart card).

Figure 6:
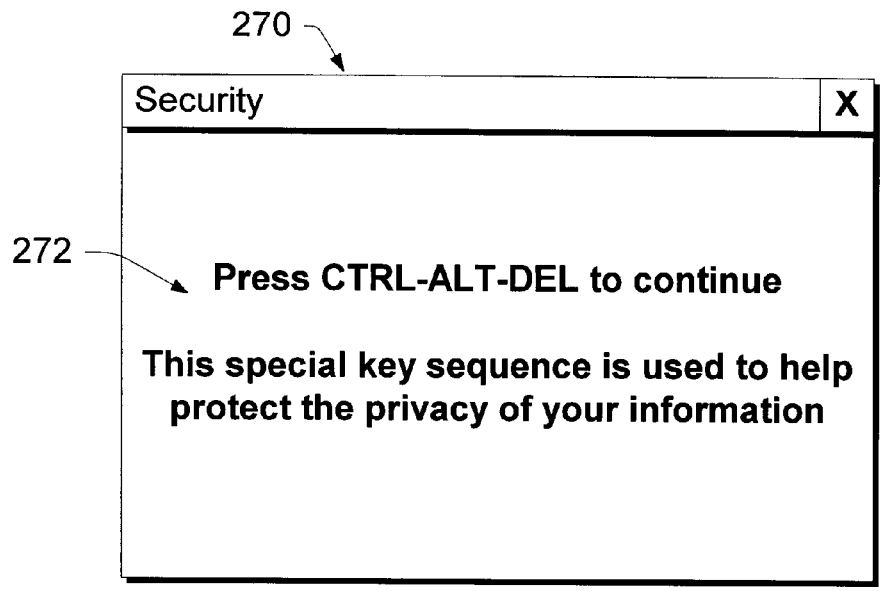
FIGS. 6 and 7 illustrate user prompts or dialogs in accordance with the invention.

In accordance with the invention, the default encryption provider performs a step of prompting a user to enter the SAS to initiate a secure operating system mode when the high-security indicator was specified with the clear data. FIG. 6 shows an example of a dialog prompt 270 used in this situation, containing text 272 asking the user to enter the SAS in order to continue. The text displayed within the prompt is specified in a prompt text parameter that is accepted from the application program by the data protect method or the data unprotect method. Before performing encryption or decryption, the encryption provider confirms that the user has initiated the secure operating system mode. The encryption provider performs the requested encryption or decryption only after performing this confirmation step.

Figure 7:
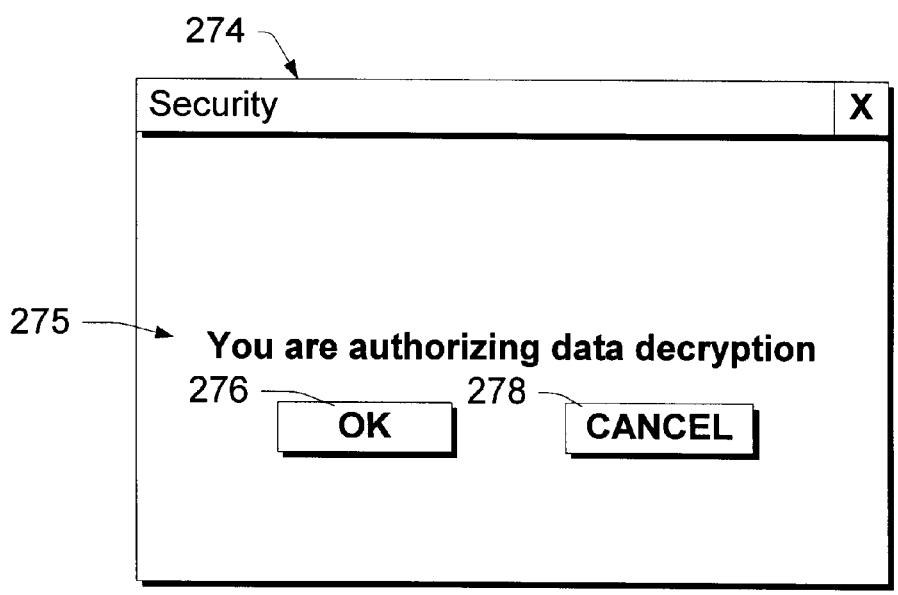

When the user initiates the secure desktop, the operating system displays a prompt such as shown in FIG. 7, designated by reference numeral 274. The encryption provider interacts with the operating system to provide prompt text 275 that is displayed within this prompt. The prompt text can be specified by the application program that performs the call to the data protect or data unprotect interfaces. The user can proceed by selecting an OK icon 276, or can cancel the operation by selecting a CANCEL icon 278.

To prevent attacking programs from emulating the secure operating system mode, and thereby gaining access to secret data, both of these prompts can be customized by the user. Specifically, a user can specify a particular background or digital watermark to be used in the dialog boxes. Alternatively, watermarks can be randomly generated for the user. The user will become familiar with whatever watermark has been selected, and will thus recognize unauthorized dialog boxes generated by attacking applications.

Figure 8:
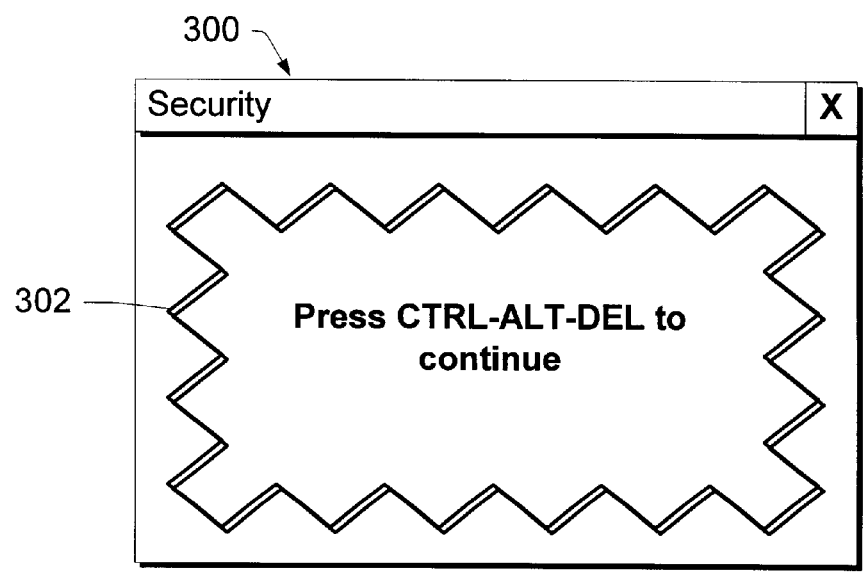
FIGS. 8 and 9 illustrate customized user prompts or dialogs in accordance with the invention.
Figure 9:
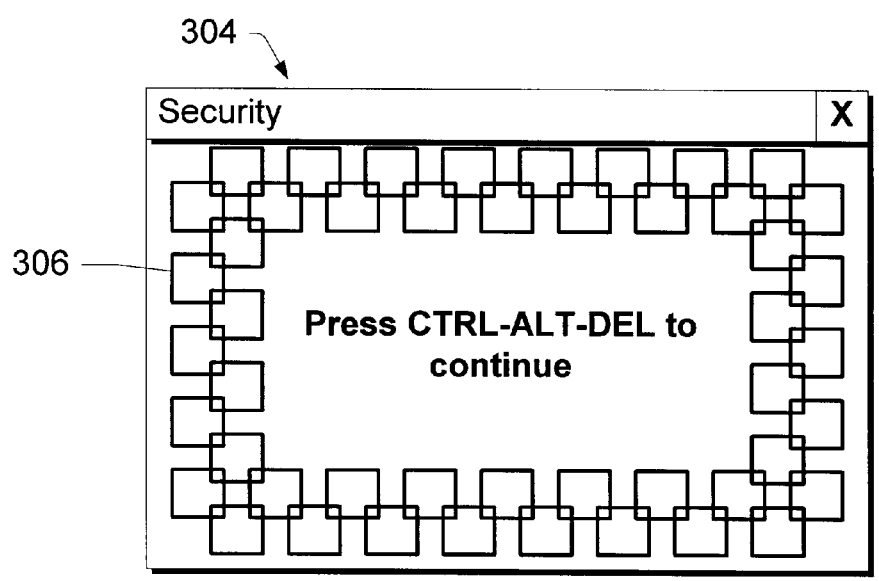

As an example, FIG. 8 shows a customized user alert dialog 300 in accordance with the invention. Customized user alert dialog 300 is generated and presented by and under the control of the encryption provider. The dialog contains text requesting that the user enter the SAS. In this example, user alert dialog 300 is customized by a zigzag line 302 around the text. FIG. 9 shows user alert dialog 304 having a different customization, using a series of interconnected box shapes 306 as the background. A user that has become accustomed to the zigzag pattern (or some other pattern selected by the user) will easily detect counterfeit dialogs by the absence of this distinctive pattern. Dialog box 274 of FIG. 7 can be similarly customized.

Instead of backgrounds and borders, user dialogs can be customized with prominent foreground images such as distinctive seals, holograms, or other easily recognizable images. Text might also be used to customize a dialog in a way that is difficult or impossible for a hostile program to duplicate.

In practice, a preferred way of customizing the user alert dialog is to specify a different graphical image for use as a dialog background in each installation of the default encryption provider. This can be done as part of the program installation process and/or at periodic times or other times specified by a user. In one embodiment, the user specifies a background by specifying a graphics file containing a graphics image in a standard format such as the "*.bmp" bitmap. This is a format that is common in Windows operating system environments. Specifying a background for the user alert dialog is similar to specifying a desktop background.

When using standard graphics formats, the user is not limited to backgrounds supplied with the trusted program, but is able to use backgrounds from many different sources. Highly personalized backgrounds, such as images of family members, can be selected. In embodiments where the trusted program itself selects the background, the background is selected from a plurality of available graphics files.

Simpler customizations are possible and effective. For example, different background colors might be chosen for each installation of the trusted program. Dialogs can also (or alternatively) have accompanying sounds that are chosen by each user or chosen randomly for each installation by the encryption provider itself.

Furthermore, customizations such as described herein can be applied to any dialog or informational presentation in which a trusted program component presents security-related information or requests, and upon which a user is expected to rely.

CONCLUSION

The invention provides a versatile and efficient architecture that provides a number of advantages over the prior art. One significant advantage is that different application programs can utilize a single, provided server to encrypt core data secrets. This promotes consistency among the applications and removes significant overhead from the applications.

Another significant advantage of the invention is that the underlying details of securing data items are hidden from calling application programs. Thus, program developers do not have to implement sophisticated security measures; such measures can be implemented with simple calls to the data protection system described herein. An added benefit is that new technologies such as smart cards will be available to application programs without extensive reprogramming.

The invention protects secrets from user-oriented and software-oriented attacks, including attacks from viruses. Significantly, access control is managed outside the application programs that generate and access data items. Because applications do not have direct access to keying material or other control data, access to one piece of data does not imply access to any other data. Furthermore, the data protection system itself does not retain the information required to decrypt stored data items. Rather, the user must be present and must supply a correct password during network logon to allow data decryption.

A further important benefit of the invention is that users are not forced to explicitly enter passwords when data access is required. Rather, user authentication is performed once, when the user logs on to the computer or network. This logon information is used for both user authentication and to derive keys for data encryption and decryption.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A method of protecting data from unauthorized access, comprising the following steps:

accepting clear data from an application program;

accepting an optional user-readable description of the clear data from the application program;

accepting optional cryptographic entropy from the application program;

encrypting the clear data along with the user-readable description of the clear data, wherein the encrypting is based at least in part on any cryptographic entropy accepted from the application program and at least in part on additional entropy supplied by an encryption provider;

returning the encrypted data and the encrypted user-readable description to the application program.

2. A method as recited in claim 1, wherein the encrypted data and user-readable description are returned as a single data block.

3. A method as recited in claim 1, further comprising the following steps:

accepting the encrypted data back from the application for decryption;

decrypting the encrypted data and returning the clear data to the application program.

4. A method as recited in claim 1, further comprising the following steps:

accepting the encrypted data and user-readable description back from the application for decryption;

decrypting the encrypted data and user-readable description and returning the clear data and decrypted user-readable description to the application program.

5. A method as recited in claim 1, comprising a further step of accepting a designation of an encryption provider from the application program.

6. A method as recited in claim 1, comprising a further step of calling an installable encryption provider to perform the encrypting step.

7. A method as recited in claim 1, wherein the encrypting step uses one or more keys that are derived at least in part from authentication of a current computer user and from the optional cryptographic entropy if such optional cryptographic entropy is specified by the application program.

8. A method as recited in claim 1, wherein the encrypting step uses one or more keys that are derived at least in part from one or more keys that are derived from a network logon code supplied by a current computer user and from the optional cryptographic entropy if such optional cryptographic entropy is available.

9. A method as recited in claim 1, wherein the encrypting step comprises:

encrypting individual data items with item keys;

encrypting the item keys with a master key;

encrypting the master key with a user key that is derived from a user-supplied code.

10. A method as recited in claim 1, wherein the encrypting step comprises:

encrypting individual data items with item keys;

generating item authentication codes for individual data items using item authentication keys;

encrypting the item keys and the item authentication keys with a master key;

generating key authentication codes for item keys and item authentication keys using a master authentication key;

encrypting the master key and the master authentication key with a user key that is derived from a user-supplied code.

11. A method of protecting data from unauthorized access, comprising the following steps:

accepting clear data from an application program;

accepting an optional user-readable description of the clear data from the application program;

accepting optional cryptographic entropy from the application program;

accepting an optional high-security indicator from the application program along with the clear data;

encrypting the clear data along with the user-readable description of the clear data, wherein the encrypting is based at least in part on any cryptographic entropy accepted from the application program;

returning the encrypted data and the encrypted user-readable description to the application program;

accepting the encrypted data back from the application for decryption;

prompting a user to enter a secure attention sequence to initiate a secure operating system mode if the high-security indicator was specified with the clear data, wherein the secure operating system mode cannot be initiated programmatically;

confirming that the user initiates the secure operating system mode;

decrypting the encrypted data and returning the clear data to the application program only after confirming that the user initiated the secure mode.

12. A method as recited in claim 11, comprising a further step of accepting prompt text from the application program and displaying the prompt text when prompting the user to enter the secure attention sequence.

13. A method as recited in claim 11, comprising a further step of displaying a prompt in the secure operating system mode, wherein the prompt is customizable so that the user can detect counterfeit prompts.

14. A method as recited in claim 11, wherein the step of prompting the user comprises displaying a prompt that is customizable so that the user can detect counterfeit prompts.

15. A method of protecting data from unauthorized access, comprising the following steps:

accepting clear data from an application program;

accepting an optional user-readable description of the clear data from the application program;

accepting optional cryptographic entropy from the application program;

encrypting the clear data along with the user-readable description of the clear data, wherein the encrypting is based at least in part on any cryptographic entropy accepted from the application program;

returning the encrypted data and the encrypted user-readable description to the application program;

wherein the encrypting step uses a key that is derived at least in part from a user logon secret;

sending the key from a client computer to a network supervisory computer that authenticates network users during user logon procedures;

encrypting a data combination at the network supervisory computer, the data combination including the key and a user identification corresponding to a currently authenticated current user of the client computer;

returning the encrypted data combination to the client computer;

storing the encrypted data combination at the client computer.

16. A method as recited in claim 15, further comprising:

sending the encrypted data combination to the network supervisory computer in order to recover the key;

decrypting the data combination at the network supervisory computer to obtain the key and the user identification in response to receiving the encrypted data combination from the client computer;

returning the key to the client computer only if the obtained user identification corresponds to the currently authenticated user of the client computer.

17. A system for protecting data items and for protecting them from unauthorized access, comprising:

a data protection server that (a) receives data items from application programs, (b) encrypts said data items, and (c) returns the encrypted data items to the application programs;

one or more encryption providers that are called by the data protection server to encrypt the data item;

a data protection interface associated with the data protection server, wherein the data protection interface accepts at least the following parameters from the application programs:

clear data;

an optional user-readable description of the clear data;

optional cryptographic entropy for use in encrypting the clear data;

wherein the data protection interface returns an encrypted representation of the clear data and user-readable description, wherein the encrypted representation is based at least in part on the optional cryptographic entropy supplied by the application program and is based also at least in part on additional entropy supplied by one or more of the encryption providers.

18. A system as recited in claim 17, wherein the data protection server operates in a different address space than the application programs.

19. A system as recited in claim 17, wherein said additional entropy comprises one or more keys that are derived from a network logon code supplied by the current computer user.

20. A system as recited in claim 17, wherein said additional entropy comprises one or more keys that are derived from a secret associated with the current computer user.

21. A system as recited in claim 17, wherein said one or more encryption providers include an encryption provider that performs the following steps:

encrypting individual data items with item keys;

encrypting the item keys with a master key;

encrypting the master key with a user key that is derived from a user-supplied code;

returning the encrypted individual data items, the encrypted item keys, and the encrypted master key to the application programs.

22. A system as recited in claim 17, wherein said one or more encryption providers include an encryption provider that performs the following steps:

encrypting individual data items with item keys;

generating item authentication codes for individual data items using item authentication keys;

encrypting the item keys and the item authentication keys with a master key;

generating key authentication codes for item keys and item authentication keys using a master authentication key;

encrypting the master key and the master authentication key with a user key that is derived from a user-supplied code;

returning the encrypted individual data items, encrypted item keys corresponding to the encrypted individual data items, and an encrypted master key to the application programs.

23. A system as recited in claim 17, wherein said one or more storage providers include a storage provider that retrieves data items in accordance with the following steps:

receiving encrypted individual data items, encrypted item keys corresponding to the encrypted individual data items, and an encrypted master key from an application program;

decrypting the encrypted master key with a user key that is derived from a user-supplied code;

decrypting the encrypted item keys with the decrypted master key;

decrypting the encrypted individual data items with the corresponding decrypted item keys.

24. A system as recited in claim 17, wherein the data protection server and the encryption providers are individually signed by a private cryptographic key that corresponds to a public cryptographic key; the data protection server and the encryption providers being configured to verify each others' signatures using the public cryptographic key.

25. A system for protecting data items and for protecting them from unauthorized access, comprising:

a data protection server that (a) receives data items from application programs, (b) encrypts said data items, and (c) returns the encrypted data items to the application programs;

one or more encryption providers that are called by the data protection server to encrypt the data item;

a data protection interface associated with the data protection server, wherein the data protection interface accepts at least the following parameters from the application programs:

clear data;

an optional user-readable description of the clear data;

optional cryptographic entropy for use in encrypting the clear data;

wherein the data protection interface returns an encrypted representation of the clear data and user-readable description, wherein the encrypted representation is based at least in part on the optional cryptographic entropy supplied by the application program;

wherein said one or more encryption providers include an encryption provider that prompts a user to enter a secure attention sequence to initiate a secure operating system mode;

wherein the secure operating system mode cannot be initiated programmatically; and wherein said encryption provider decrypts encrypted data only after confirming that the user initiates the secure operating system mode.

26. A system for protecting data items and for protecting them from unauthorized access, comprising:

a data protection server that (a) receives data items from application programs, (b) encrypts said data items, and (c) returns the encrypted data items to the application programs;

one or more encryption providers that are called by the data protection server to encrypt the data item;

a data protection interface associated with the data protection server, wherein the data protection interface accepts at least the following parameters from the application programs:

clear data;

an optional user-readable description of the clear data;

optional cryptographic entropy for use in encrypting the clear data;

wherein the data protection interface returns an encrypted representation of the clear data and user-readable description, wherein the encrypted representation is based at least in part on the optional cryptographic entropy supplied by the application program;

wherein said one or more encryption providers include an encryption provider that presents a user-customizable prompt for a user to enter a secure attention sequence to initiate a secure operating system mode;

wherein the secure operating system mode cannot be initiated programmatically; and wherein said encryption provider decrypts encrypted data only after confirming that the user initiates the secure operating system mode.

27. A system for protecting data items and for protecting them from unauthorized access, comprising:

a data protection server that (a) receives data items from application programs, (b) encrypts said data items, and (c) returns the encrypted data items to the application programs;

one or more encryption providers that are called by the data protection server to encrypt the data item;

a data protection interface associated with the data protection server, wherein the data protection interface accepts at least the following parameters from the application programs:

clear data;

an optional user-readable description of the clear data;

optional cryptographic entropy for use in encrypting the clear data;

wherein the data protection interface returns an encrypted representation of the clear data and user-readable description, wherein the encrypted representation is based at least in part on the optional cryptographic entropy supplied by the application program;

wherein said one or more encryption providers include an encryption provider that encrypts data using a key that is derived at least in part from a user logon secret, wherein said encryption provider is configured to perform steps comprising:

sending the key from a client computer to a network supervisory computer that authenticates network users during user logon procedures;

encrypting a data combination at the network supervisory computer, the data combination including the key and a user identification corresponding to a currently authenticated current user of the client computer;

returning the encrypted data combination to the client computer;

storing the encrypted data combination at the client computer.

28. A system as recited in claim 27, wherein said encryption provider is configured to perform further steps comprising:

sending the encrypted data combination to the network supervisory computer in order to recover the key;

decrypting the data combination at the network supervisory computer to obtain the key and the user identification in response to receiving the encrypted data combination from the client computer;

returning the key to the client computer only if the obtained user identification corresponds to the currently authenticated user of the client computer.

29. A method of protecting data from unauthorized access, comprising the following steps:

accepting clear data from an application program;

accepting first cryptographic entropy from the application program;

providing the clear data and first cryptographic entropy to an encryption provider for encryption of the clear data;

encrypting the clear data with the encryption provider, wherein the encrypting is based on both the first cryptographic entropy accepted from the application and on second cryptographic entropy supplied by the encryption provider; and returning the encrypted data to the application program.

30. A method as recited in claim 29, wherein the second cryptographic entropy is derived at least in part from authentication of a current computer user.

31. A method as recited in claim 29, wherein the second cryptographic entropy is derived at least in part from a network logon code supplied by a current computer user.

32. A method as recited in claim 29, wherein the second cryptographic entropy is derived at least in part from a network logon secret associated with the current computer user.

33. A method as recited in claim 29, wherein the second cryptographic entropy is derived at least in part from a secret associated with the current computer user.

34. A method as recited in claim 29, further comprising:

accepting the encrypted data back from the application program for decryption; and decrypting the encrypted data and returning the clear data to the application program.

35. A method as recited in claim 29, wherein the encrypting comprises:

encrypting the clear data with an item key;

encrypting the item key with a master key; and encrypting the master key with the first and second cryptographic entropy.

36. A computer-readable storage medium containing instructions that are executable to implement an application programming interface, the application programming interface having a data protect method that performs actions comprising:

accepting clear data from an application program;

accepting first cryptographic entropy from the application program;

encrypting the clear data based on both the accepted first cryptographic entropy and additionally supplied second cryptographic entropy; and returning the encrypted data to the application program.

37. A method as recited in claim 36, wherein the encrypting comprises calling an encryption provider that supplies the second cryptographic entropy and that encrypts the clear data based on both the accepted first cryptographic entropy and the additionally supplied second cryptographic entropy.

38. A method as recited in claim 36, wherein the second cryptographic entropy is derived at least in part from authentication of a current computer user.

39. A method as recited in claim 36, wherein the second cryptographic entropy is derived at least in part from a network logon code supplied by a current computer user.

40. A method as recited in claim 36, wherein the second cryptographic entropy is derived at least in part from a network logon secret associated with the current computer user.

41. A method as recited in claim 36, wherein the second cryptographic entropy is derived at least in part from a secret associated with the current computer user.

42. A method as recited in claim 36, further comprising:

accepting the encrypted data back from the application program for decryption; and decrypting the encrypted data and returning the clear data to the application program.

43. A method as recited in claim 36, further comprising calling an installable encryption provider to perform the encrypting.

44. A method as recited in claim 36, wherein the encrypting comprises:

encrypting the clear data with an item key;

encrypting the item key with a master key; and encrypting the master key with the first and second cryptographic entropy.

45. A system for protecting data items from unauthorized access, comprising:

a data protection server that (a) receives data items from application programs, (b) encrypts said data items, and (c) returns the encrypted data items to the application programs;

at least one encryption provider that is called by the data protection server to encrypt the data items;

a data protection interface associated with the data protection server, wherein the data protection interface accepts clear data and first cryptographic entropy from the application programs;

wherein the data protection interface returns an encrypted representation of the clear data, wherein the encrypted representation is based on both the first cryptographic entropy supplied by the application program and second cryptographic entropy supplied by said at least one encryption provider.

46. A system as recited in claim 45, wherein the second cryptographic entropy is derived at least in part from authentication of a current computer user.

47. A system as recited in claim 45, wherein the second cryptographic entropy is derived at least in part from a network logon code supplied by a current computer user.

48. A system as recited in claim 45, wherein the second cryptographic entropy is derived at least in part from a network logon secret associated with the current computer user.

49. A system as recited in claim 45, wherein the second cryptographic entropy is derived at least in part from a secret associated with the current computer user.

50. A system as recited in claim 45, wherein the data protection interface accepts the encrypted data back from the application program for decryption, decrypts the encrypted data, and returns the clear data to the application program.

51. A system as recited in claim 45, wherein the data encryption provider encrypts the data items in accordance with actions comprising:

encrypting the data items with item keys;

encrypting the item keys with a master key; and encrypting the master key with the first and second cryptographic entropy.

52. A method of protecting data from unauthorized access, comprising the following steps:

accepting clear data from an application program;

accepting optional cryptographic entropy from the application program;

encrypting the clear data based at least in part on any cryptographic entropy accepted from the application program and additionally on a key that is derived at least in part from a network-related secret associated with a currently authenticated current user of the client computer;

returning the encrypted data to the application program;

sending the key from a client computer to a network supervisory computer that authenticates network users during user logon procedures;

encrypting a data combination at the network supervisory computer, the data combination including the key and a user identification corresponding to the currently authenticated current user of the client computer;

returning the encrypted data combination to the client computer;

storing the encrypted data combination at the client computer.

53. A method as recited in claim 52, further comprising:

sending the encrypted data combination to the network supervisory computer in order to recover the key;

decrypting the data combination at the network supervisory computer to obtain the key and the user identification in response to receiving the encrypted data combination from the client computer;

returning the key to the client computer only if the obtained user identification corresponds to the currently authenticated user of the client computer.

54. A system for protecting data items from unauthorized access, comprising:

a data protection server that (a) receives data items from application programs, (b) encrypts said data items, and (c) returns the encrypted data items to the application programs;

one or more encryption providers that are called by the data protection server to encrypt the data item;

a data protection interface associated with the data protection server, wherein the data protection interface accepts clear data and optional cryptographic entropy from the application programs;

wherein the data protection interface returns an encrypted representation of the clear data and user-readable description, wherein the encrypted representation is based at least in part on the optional cryptographic entropy supplied by the application program;

wherein said one or more encryption providers include an encryption provider that encrypts data using a key that is derived at least in part from a network related secret associated with a currently authenticated computer user, wherein said encryption provider is configured to perform steps comprising:

sending the key from a client computer to a network supervisory computer that authenticates network users during user logon procedures;

encrypting a data combination at the network supervisory computer, the data combination including the key and a user identification corresponding to the currently authenticated current user;

returning the encrypted data combination to the client computer;

storing the encrypted data combination at the client computer.

55. A system as recited in claim 54, wherein said encryption provider is configured to perform further steps comprising:

sending the encrypted data combination to the network supervisory computer in order to recover the key;

decrypting the data combination at the network supervisory computer to obtain the key and the user identification in response to receiving the encrypted data combination from the client computer; and returning the key to the client computer only if the obtained user identification corresponds to the currently authenticated user of the client computer.

* * * * *

UNITED STATES PATENT AND TRADEMARK OFFICE
CERTIFICATE OF CORRECTION

PATENT NO.   : 6,389,535 B1
DATED        : May 14, 2002
INVENTOR(S)  : Thomlinson It is certified that error appears in the above-identified patent and that said Letters Patent is hereby corrected as shown below:

<u>Column 1,</u>
Line 42, replace "Modem" with -- Modern --.

<u>Column 3,</u>
Line 62, insert -- on -- between "-" and "the".

Signed and Sealed this

Thirty-first Day of December, 2002

JAMES E. ROGAN
*Director of the United States Patent and Trademark Office*